United States Patent

Gutman et al.

Patent Number: 5,436,622
Date of Patent: Jul. 25, 1995

[54] VARIABLE FREQUENCY VIBRATORY ALERT METHOD AND STRUCTURE

[75] Inventors: Jose Gutman; Gregg E. Rasor, both of Boynton Beach, Fla.

[73] Assignee: Motorola, Inc., Schaumburg, Ill.

[21] Appl. No.: 85,894

[22] Filed: Jul. 6, 1993

[51] Int. Cl.[6] .................................. H04Q 7/00
[52] U.S. Cl. ....................... 340/825.46; 340/407.1
[58] Field of Search ........... 340/407.1, 825.44, 825.46, 340/825.48, 311.1; 318/114, 119, 121, 126, 129, 135

[56] References Cited

U.S. PATENT DOCUMENTS

| | | |
|---|---|---|
| 3,336,529 | 8/1967 | Tygart. |
| 4,395,665 | 7/1983 | Buchas ................................ 318/114 |
| 4,710,655 | 12/1987 | Masaki. |
| 5,023,504 | 6/1991 | Mooney et al. ................. 340/825.46 |
| 5,107,540 | 4/1992 | Mooney et al. .................. 340/407.1 |
| 5,229,744 | 7/1993 | Ogura ............................. 340/825.46 |
| 5,245,245 | 9/1993 | Goldenberg .................... 340/825.44 |
| 5,293,161 | 3/1994 | MacDonald et al. ........... 340/825.46 |
| 5,327,120 | 7/1994 | McKee et al. ................. 340/825.46 |

Primary Examiner—Donald J. Yusko
Assistant Examiner—Edward Merz
Attorney, Agent, or Firm—James A. Lamb

[57] ABSTRACT

A portable vibratory alerting device (20) is part of a resonant system (20, 30) and has a resonant vibrator (60) for both generating a vibrational alert and sensing the resonant frequency of the resonant system. The vibrator (60) is driven by a variable frequency driver (76, 78), and thereafter the resonant frequency is measured by a sensor (82). A vibration controller (72) causes the frequency of the vibrator to be substantially equal to the resonant frequency of the system.

Alternately, a portable alerting device (520) has both a vibrator (160) and a sensor (166) for sensing the amplitude of a vibratory alert at various frequencies. A vibration controller (72) generates a vibratory alert at an optimum frequency in response to the sensed amplitudes.

11 Claims, 6 Drawing Sheets

VARIABLE FREQUENCY VIBRATORY ALERT METHOD AND STRUCTURE

FIELD OF THE INVENTION

This invention relates generally to the field of portable electronic devices capable of generating vibratory alerts. More specifically, this invention relates to a method and apparatus for automatically changing a tactile sensation of a vibratory alert.

BACKGROUND OF THE INVENTION

In many portable electronic devices a vibratory alert is used to indicate the occurrence of an event. In a device such as a pager or portable telephone, the vibratory alert is used to silently notify the user of an important event such as the reception of a message. When such a device is worn on the belt of a user, the vibratory alert produces a tactile sensation experienced by the user. In order to assure that the tactile sensation is sufficient to alert the user of the occurrence of the event, it is desirable to maximize the tactile sensation produced by a device such as a pager.

Upon the occurrence of the vibratory alert, the pager forms part of a resonant system. If the frequency of the vibratory alert is not close to the resonant frequency of the resonant system, the tactile sensation experienced by the user may be significantly reduced. Many variables go into determining the resonant frequency of the resonant system, these variables include the place and method of attachment of the pager to the user, the type of clothing worn by the user, physical attributes of the user, and construction variables unique to the pager. With these types of variables, it is virtually impossible to accurately determine the resonant frequency of the resonant system comprising the pager at the time of manufacture of the pager. Thus, it is unlikely that a maximum amount of tactile sensation may be experienced by a user when the frequency of the vibratory alert is set at the time of manufacture of the pager. What is needed is a method for maximizing the tactile sensation due to the vibratory alert responsive to changes in the resonant frequency of the resonant system.

This problem is further compounded by the miniaturization of paging devices. With miniaturization come reduction in the size of a battery supplying the pager with power, and thus a reduction in the power available for generation of the vibratory alert. Thus, what is needed is a vibratory alert having improved tactile sensation without increasing the power drawn to provide the vibratory alert.

Additionally, switching a vibrator on and off at timed intervals, such as for one half second intervals, provides a user of the device with a pleasing and discernable switched tactile alert. Furthermore, the switched tactile alert may reduce the total current drawn from the battery. However, since the switched vibratory alert requires an electrical to mechanical energy conversion, an initial current surge is typically experienced by the battery at switch transitions. Repeated switching off and on introduces repeated current surges on the battery. As the battery nears the end of its life, the current surges may cause other parts of the battery powered electronics in the pager to malfunction. Thus, what is needed is a method of reducing the current surges while providing the pleasing and distinctive switching of the tactile sensation.

SUMMARY OF THE INVENTION

In accordance with the present invention, a method is provided for generating a vibratory alert having a vibration frequency. The method operates in a portable alerting device being a member of a resonant system having a resonant vibration frequency. The method comprises the steps of: driving the vibration frequency of the vibratory alert at a first frequency for a first period; determining a resonant frequency of the resonant system after said step of first driving; and driving the vibration frequency of the vibratory alert at a frequency substantially corresponding to the resonant frequency.

In further accord with the present invention, a portable alerting device for generating a vibratory alert signal having both a vibration frequency and a vibration amplitude comprises a sensor for sensing a vibration amplitude of the vibratory alert signal and an adjuster for adjusting a vibration frequency of the drive signal in response to the vibration amplitude of the vibratory alert.

DESCRIPTION OF THE INVENTION

Figure 1:
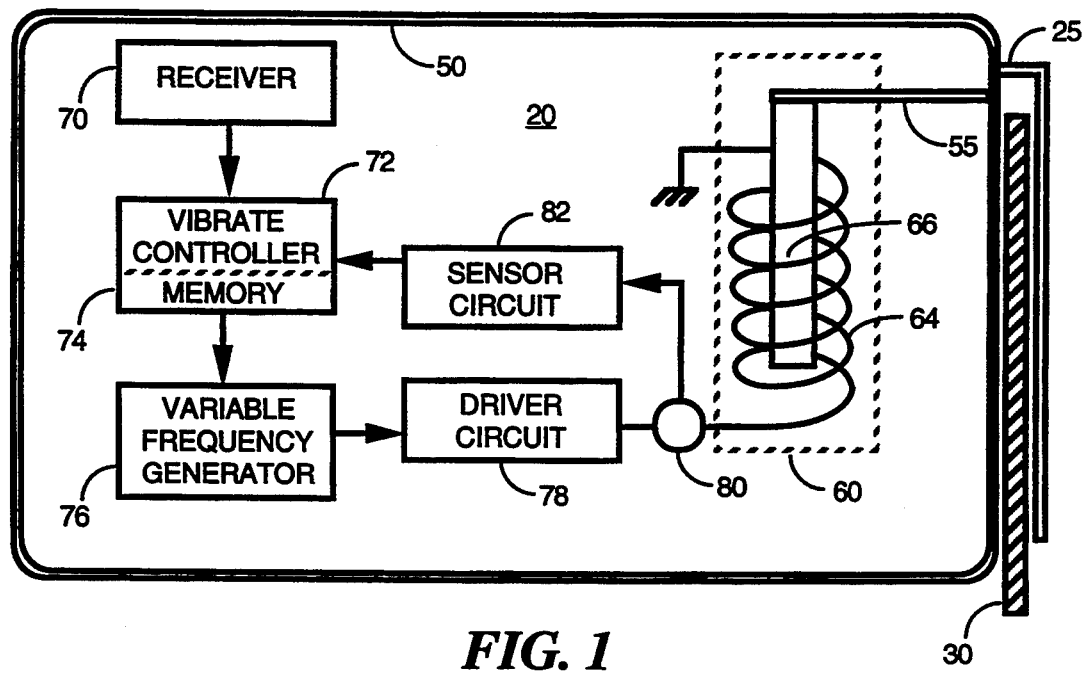
FIG. 1 shows a portable device and its contents attached through a belt clip to the belt of a user to form a resonant system, the contents includes a means for generating a vibratory alert in accordance with the preferred embodiment of the present invention.

FIG. 1 shows a portable device 20 and its contents physically attached through a belt clip 25 to the belt 30 of a user to form both a resonant system and a means for generating a vibratory alert. Portable device 20 may be any portable electronic device capable of providing to a user of the device a vibratory alert, such as a pager.

Figure 2:
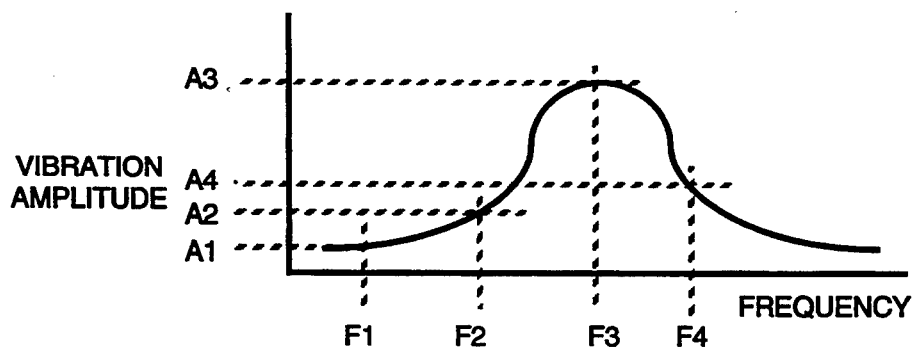
FIG. 2 depicts an idealized plot of the frequency and amplitude characteristics of the resonant system of FIG. 1.

FIG. 2 represents an idealized plot of the frequency and amplitude characteristics of the resonant system of FIG. 1 during a vibratory alert. The horizontal axis of FIG. 2 represents a vibratory frequency, and four vibration frequencies, F1 through F4 are shown. The vertical axis represents the vibration amplitude of the resonant system, and four exemplary vibration amplitudes, A1 through A4, are shown. The curve represents the frequency versus amplitude response of the resonant system. As the vibration frequency increases from F1 to F3, the amplitude of the vibration increases. Correspondingly, the tactile sensation experienced by the user increases. Then as the vibration frequency increases beyond F3, the amplitude decreases, and the amplitude at F4 is substantially less than F3. Since the amplitude substantially around F3 is a maximum, F3 represents the resonant frequency of the resonant system. Note, the resonant frequency may change depending upon how the user holds the pager 20. If worn on the belt, F3 may be the resonant frequency. But, if the user keeps the pager 20 in his pocket, then the resonant frequency may shift to F2. Alternatively, if the user keeps the pager 20 in his hand, then the resonant frequency may shift as low as F1. Thus, the resonant frequency of the resonant system may change depending upon how the user is holding the pager.

Referring back to FIG. 1, pager 20 is capable of determining the resonant frequency of the resonant system formed by the pager and the item to which it is attached, and then capable of adjusting the frequency of the vibratory alert to be substantially equal to the determined resonant frequency. A belt clip 25, is attached to the user through contact with the user's belt 30, and is also attached to a housing 50 which houses the electrical components of the pager 20. Coupled to the housing 50 through armature 55 is a resonant vibrator 60. Although armature 55 is shown connected directly to housing 50, it may alternatively be coupled to the housing by mounting the vibrator 60 and armature 55 to a printed circuit board or other retaining means, and then mounting the printed circuit board or other retaining means within the housing 50. Resonant vibrator 60 includes coil forming an electromagnet 64, and a moving mass 66. Moving mass 66 is preferably a permanent magnet, or alternately may be either electromagnetic or ferrous in nature. Moving mass 66 is coupled to the armature 55 and is located within a magnetic field generated by the electromagnet 64. When current flows through the electromagnet 64, a magnetic field is generated, and the moving mass 66 is drawn into the field. Then, when the current flow stops, the magnetic field collapses, and armature 55 draws moving mass 66 back out of the electromagnet 64. By periodically causing current flow through the electromagnet 64, an oscillation of the moving mass 66 is established. Some of the energy of the oscillation is transferred to the housing 50 through the armature 55, thereby causing the housing to vibrate. The frequency of the oscillation corresponds to the frequency of the vibratory alert, which corresponds to the frequency of the periodic current flow through the electromagnet 64, constituting a pulsating vibratory drive signal frequency.

Figure 3:
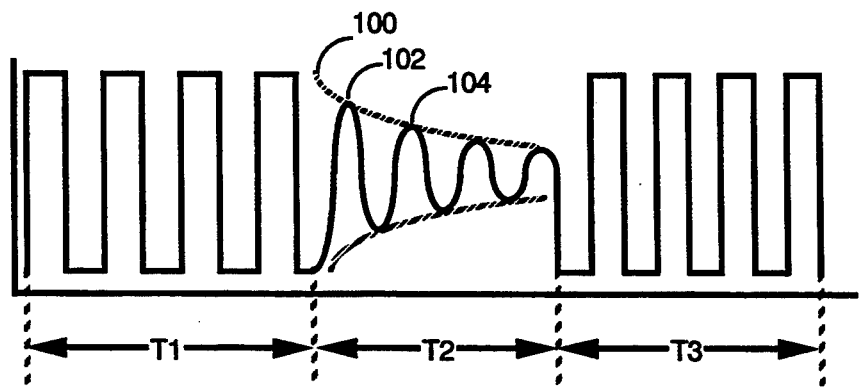
FIG. 3 shows a pulsating signal for driving a resonant vibrator, and a signal indicative of the resonant frequency of the resonant system in the absence of the pulsating signal, in accordance with the preferred embodiment of the present invention.

FIG. 3 shows a pulsating signal for driving a resonant vibrator, and a signal indicative of the resonant frequency of the resonant system in the absence of the pulsating signal, in accordance with the preferred embodiment of the present invention. Periodic current flow may be caused by a pulsating signal such as the square wave voltage signal occurring during either T1 or T3 of FIG. 3. T2 shows another characteristic of vibrator 60 upon termination of a pulsating signal. Moving mass 66 continues to oscillate at a decaying amplitude. Since moving mass 66 is magnetic, the moving magnetic field of moving mass 66 induces a back voltage in coil 64 corresponding to the frequency and amplitude of its movement, as shown by back voltage decay envelope 100. The initial amplitude of the envelope at peak 102 corresponds to the amplitude of the vibration during interval T1. Thus, if the frequency during T1 corresponded to F1 of FIG. 2, the voltage at peak 102 would be substantially lower than if the frequency during interval T1 corresponded to F3 of FIG. 2. Thus, the amplitude of envelope 100 may be used to determine the amplitude of the vibratory alert at the frequency used during interval T1. Furthermore, after the termination of the pulsating signal, the moving mass 66 tends to resonate at a frequency corresponding to the resonant frequency of the pager/user resonant system. The frequency of the moving mass 66 may be determined by measuring the frequency of the signal within decay envelope 100. Such a measurement could be made by timing the interval between peaks in the signal, such as peaks 102 and 104. Alternatively, a known method of zero crossing detection timing could be used. By this method, the resonant frequency of the resonant system may be readily determined.

Figure 4:
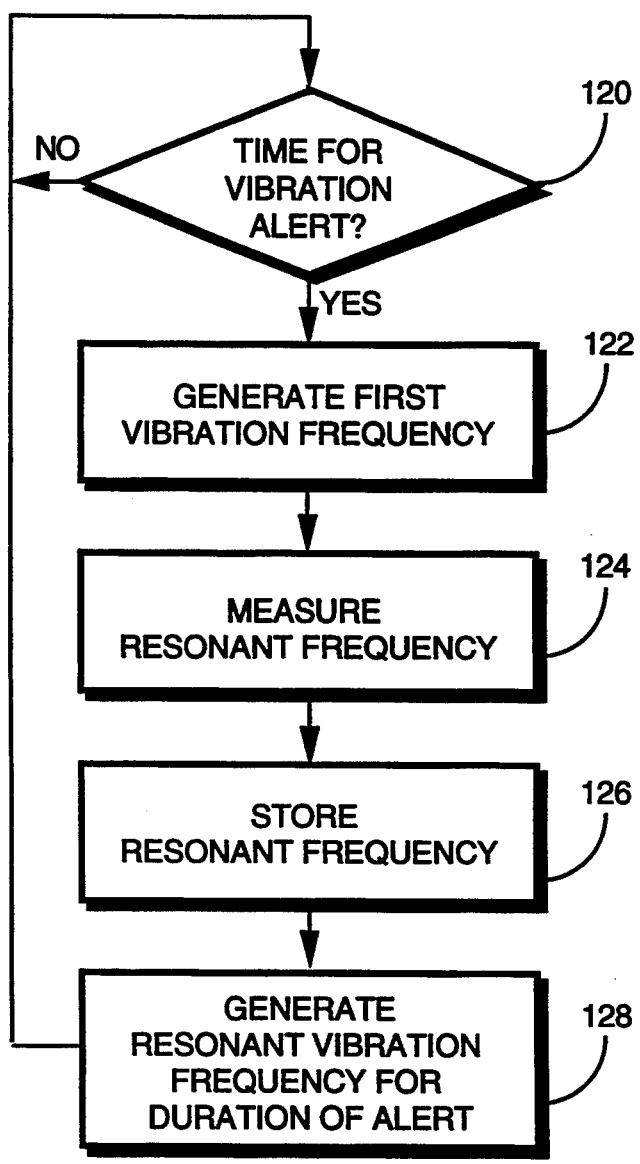
FIG. 4 shows a flowchart for automatically generating a vibratory alert at the resonant frequency of the resonant system in accordance with the present invention.

Referring back to FIG. 1 while simultaneously referring to FIGS. 3 and 4, pager 20 includes a receiver 70 for receiving and decoding radio frequency paging messages carried on a paging protocol such as POCSAG. Upon the reception of a message, the receiver 70 sends a signal to vibrate controller 72 that a vibratory alert should be generated. Receiver 70 may also signal vibrate controller 72 to generate a vibratory alert in response to the pager being switched on, or a time of day alarm. This corresponds to a determination of time to vibrate, step 120 of FIG. 4. Vibrate controller 72 acts as an adjuster for adjusting the vibration frequency in response to the vibration amplitude, and has a memory 74, which is preferably nonvolatile, storing a representation of at least one vibration frequency. The representation of the vibration frequency from memory 74 is sent to variable frequency generator 76 which generates a variable frequency signal corresponding to the representation of vibration frequency in memory 74. Driver 78 converts the variable frequency signal into a pulsating signal for driving vibrator 60. Driver circuit 78 may include power switching transistors as well as voltage multiplying inductors for driving vibrator 60, the various configurations being known to those familiar with the art. The pulsating signal passes through switch 80, causing moving mass 66 to oscillate, thereby generating a vibratory alert. This first vibration corresponds to the signal of interval T1 of FIG. 3, and is shown by step 122 of FIG. 4. After a termination of the pulsating signal, switch 80 enables sensor circuit 82 to measure the resonant frequency of the resonant system, step 124. Sensor circuit 82 processes a waveform corresponding to the waveform shown during interval T2 of FIG. 3. Sensor circuit 82 may consist of a peak detector and a timer for detecting the time differences between peaks 102 and 104 of FIG. 3. The resonant frequency of the resonant system substantially corresponds to the time between peaks 102 and 104. Alternatively, a known zero crossing detector can be used to determine the resonant frequency. Upon determining the resonant frequency of the system, sensor circuit 82 communicates the resonant frequency to vibrate controller 72 which stores the frequency in memory 74, step 126, FIG. 4. Thereafter, in step 128, vibrate controller 72 causes the vibrator 60 to vibrate, but this time at the resonant frequency determined by sensor circuit 82. Hence, the vibrate controller 72 adjusts the vibration frequency to the sensed resonant frequency. The vibrator's pulsating signal corresponds to the signal T3, FIG. 3, and is substantially equal to the resonant frequency of the resonant system. Thus, the resonant frequency of the resonant system has been quickly determined, and the vibratory alert is generated substantially at the resonant frequency.

Finally, the vibratory alert may include switching the vibrator on and off at intervals such as one half second. In this case, it may not be necessary to determine the resonant frequency by repeating steps 120 through 128 at the beginning of each one half second interval. Instead, the vibration frequency stored in memory 74 may be again used, thereby skipping steps 122 through 126, and directly executing step 128 for the one half second interval. Furthermore, the resonant frequency need not be measured before every alert sequence, but may be measured only if an alert has not been generated for a predetermined time of one hour or one day for example. The time may be determined in response to reasonable expectations or indications of the use of the pager. For example, on an initialization routine such as a power up sequence, the frequency of the resonant system can be determined for subsequent use. Also, vibrator 60 is shown as an electromagnetic resonant vibrator. Alternative vibration means having similar characteristics are also contemplated. Such an alternative vibrator may be a piezoelectric resonant vibrator. At least portions of vibrate controller 72, memory 74, variable frequency generator 76, driver circuit 78, switch 80 and sensor circuit 82 may be included within the operation of a microcomputer, which may concurrently perform many of the functions of the receiver 70.

Figure 5:
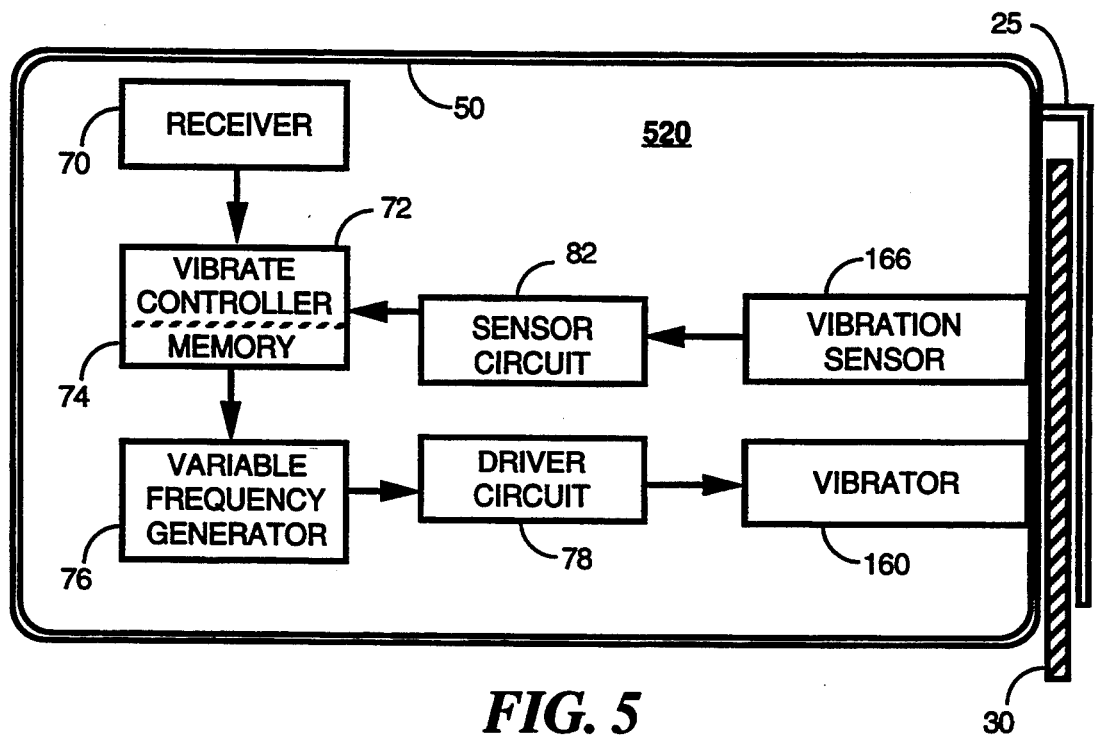
FIG. 5 shows a block diagram for generating a vibratory alert at the resonant frequency of the resonant system in accordance with an alternative embodiment of the present invention.

FIG. 5 shows a block diagram of an alternative embodiment of the present invention. In this embodiment, the frequency of vibrator 160 is automatically adjusted by the vibrate controller 72 in response to the vibration amplitude detected by vibration sensor 166. Pager 520 has a belt clip 25 attached to a belt 30 and housing 50, and includes a receiver 70, vibrate controller 72 with memory 74, variable frequency generator 76 with driver circuit 78 and sensor circuit 82, which correspond in function to those of pager 20 of FIG. 1. However, instead of time multiplexing the function of means 60 for vibrate and sense as in FIG. 1, the pager of FIG. 5 has an vibrator 160 and and a sensor 166 independent of the vibrator 160, both mechanically coupled to housing 50. This has the advantage of providing for the measurement of vibration amplitude during the vibratory alert. In this embodiment, vibrator 160 may be any type of variable frequency vibrator including a motor with an eccentric weight, a resonant piezoelectric vibrator, or an electro-mechanical vibrator similar to vibrator 60 of FIG. 1. If an electric motor is used, the electric motor generates a rotational movement, and the eccentric mass, which is coupled to the electric motor, converts the rotational movement into a vibrational alert having both a vibration amplitude and a vibration frequency corresponding to rotational movement. The electric motor may be driven by either a DC or AC (synchronous or inductive) signal, in which case the rotational movement and the vibrational frequency is responsive to one of a variable DC voltage signal and a variable frequency signal respectively.

The sensor may be any type of vibration sensor, such as vibrator 60 when operating in the sense mode. In an alternative example a vibration sensor described in U.S. Pat. No. 3,336,529, entitled "Vibrating Reed Frequency Responsive Device" to W. H. Tygart, Dec. 3, 1962, may be used. The amplitude of vibration may be determined by rectifying the voltage output of the sensor and then converting the analog voltage into a digital signal for analysis by the controller 72. The frequency of a resonant vibrator may be adjusted by adjusting the frequency of the pulsating signal applied to the vibrator. Alternatively, the frequency of a DC motor with an eccentric mass may be adjusted by generating a variable DC voltage power supply with the variable frequency generator 76 and driver circuit 78. Both a typical vibrator 160 and a typical vibration sensor 166 may have planes of vibration for either generating or sensing vibration. The system of FIG. 5 performs optimally when the respective planes of vibration are in coincidence.

Figure 6:
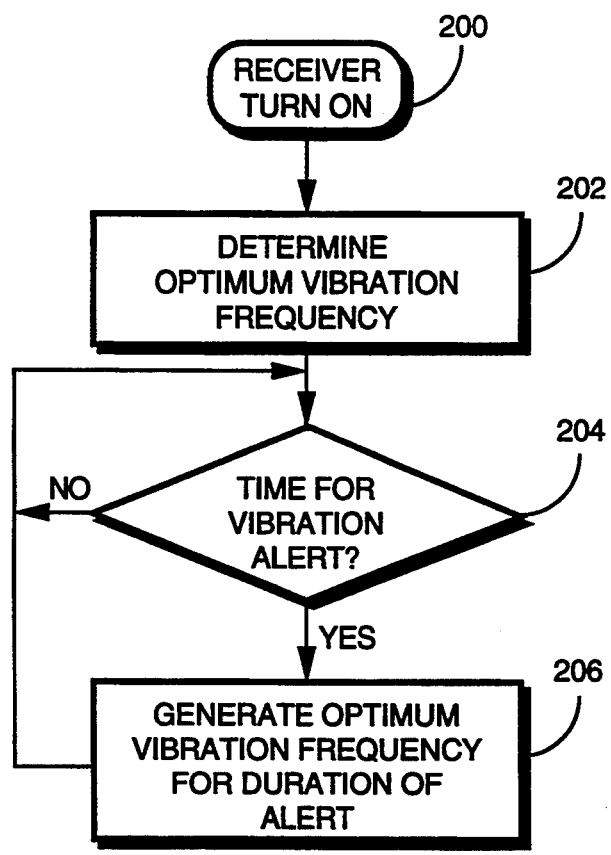
FIG. 6 shows a flowchart describing a first method of automatically adjusting the vibration frequency in accordance with the alternate embodiment of the present invention.

FIG. 6 is a flowchart describing a first method of automatically adjusting the vibration frequency in accordance with the present invention. In step 200, after the receiver is first turned on, for example at the beginning of a typical day, the pager proceeds to step 202 to determine the optimum vibration frequency. This determination is made in accordance with the flow chart of FIG. 8. Then step 204 waits for the moment when a vibratory alert is to be generated by the pager. Upon that occurrence, a vibratory alert at the determined optimum vibration frequency is generated at step 206. This method has the advantage of only determining the optimum vibration frequency when a pager is initially turned on. In this embodiment, it is anticipated that in the typical user's daily routine, he attaches the pager to his belt and turns the pager on at the beginning of his day. The position of the pager, and thus the resonant frequency of the resonant system does not substantially change until the end of the user's day when the pager is removed from the user's belt and then switched off.

Figure 7:
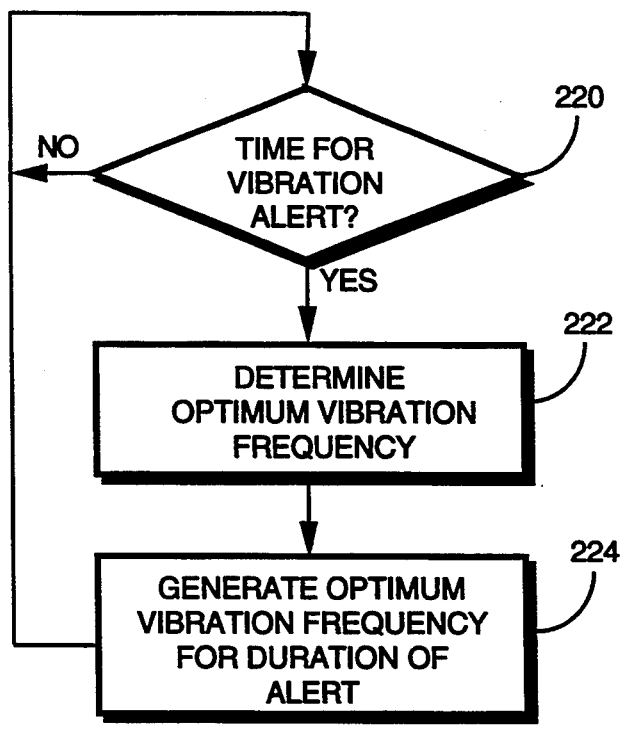
FIG. 7 shows a flowchart describing a second method of automatically adjusting a vibration frequency of a vibration alert signal in accordance with the alternative embodiment of the present invention.

FIG. 7 is a flowchart describing a second method of automatically adjusting the vibration frequency in accordance with the present invention. In this method, upon determining that a vibratory alert is to be generated by the pager, step 220, the optimum vibration frequency is determined, step 222, and then the alert is generated at the optimum vibration frequency substantially immediately thereafter, step 224. The preferred method for determining the optimum vibration frequency, step 222, is shown by using the flow chart of FIG. 8, as described below. This embodiment has the advantage of determining the optimum vibration frequency each time an alert is generated. This operation is similar to the operation of the pager of FIG. 1. For the user who regularly changes the position of his pager, and consequently the resonant frequency of the resonant system, the resonant frequency of the resonant system is determined before each vibratory alert, thereby assuring that the user experiences a maximum tactile sensation upon the generation of each vibratory alert.

Figures 8, 9:
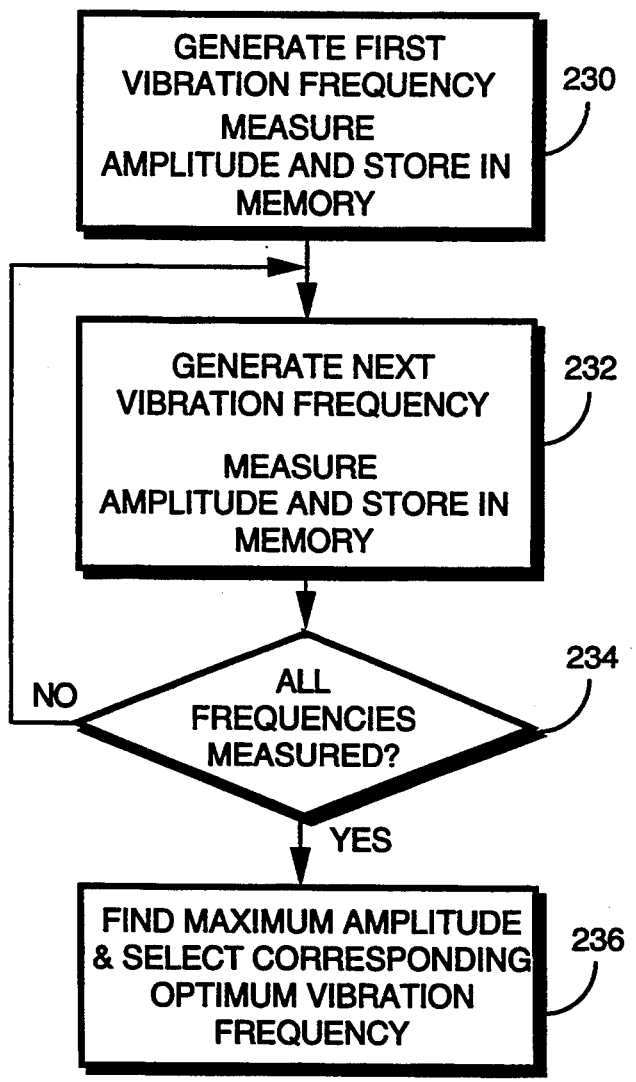
FIG. 8 shows a flow chart describing a method of determining an optimum vibration amplitude in accordance with the alternative embodiment of the present invention.
FIG. 9 shows a table of measured vibration amplitudes corresponding to frequencies of a drive signal.

FIG. 8 is a flowchart describing the preferred method of determining an optimum vibration in accordance with the present invention. By this method, the optimum vibration frequency is determined by sweeping the resonant system frequency with a series of predetermined frequencies, measuring and storing the amplitude of each frequency and determining the optimum frequency to be equal to the frequency having the maximum amplitude. In step 230, a first vibration frequency, which may correspond to F1 of FIG. 2 is generated and the amplitude measured and stored; the amplitude may correspond to A1 of FIG. 2. Then in steps 232 and 234, the remaining frequencies are generated, which may correspond to F2 through F4 of FIG. 2 and their corresponding amplitudes, A2 through A4, are measured and stored. Upon entry into step 236, memory 74 of vibrate controller 72 has contents corresponding to FIG. 9, wherein the generated frequencies, F1 through F4 have corresponding amplitudes A1 through A4. If the resonant characteristics of the resonant system correspond to those of FIG. 2, A3 would be the greatest amplitude, followed by A4, and A2, with A1 having the least amplitude. Since A3 has the greatest amplitude, step 236 would select F3 as the optimal vibration frequency. It can be appreciated that substantially more than four frequencies may be used in the determination of the optimal frequency. Furthermore, methods other than a frequency sweep may be used to determine the optimum frequency, including successive approximation and peak detection methods.

Furthermore, the pager of FIG. 1 is also capable of performing the functions of the flow charts of FIGS. 6 through 8 and generation of the table 94 of FIG. 9. Referring to FIG. 3, upon generation of a vibration frequency during interval T1, the resulting amplitude of vibration may be determined by analyzing decay envelope 100. A preferred method would be to measure the peak voltage at peak 102. Thus, the pager of FIG. 1 is also capable of determining an optimum vibration frequency by measuring the amplitude of vibration at several vibratory frequencies. Additionally, since the pagers of FIGS. 1 and 6 vibrate at an optimal frequency, additional energy is not drawn from the battery in order to power a larger vibrator, higher vibrator speed, or larger moving mass. Thus, additional tactile sensation is provided without a substantial increase in battery current.

Figure 10:
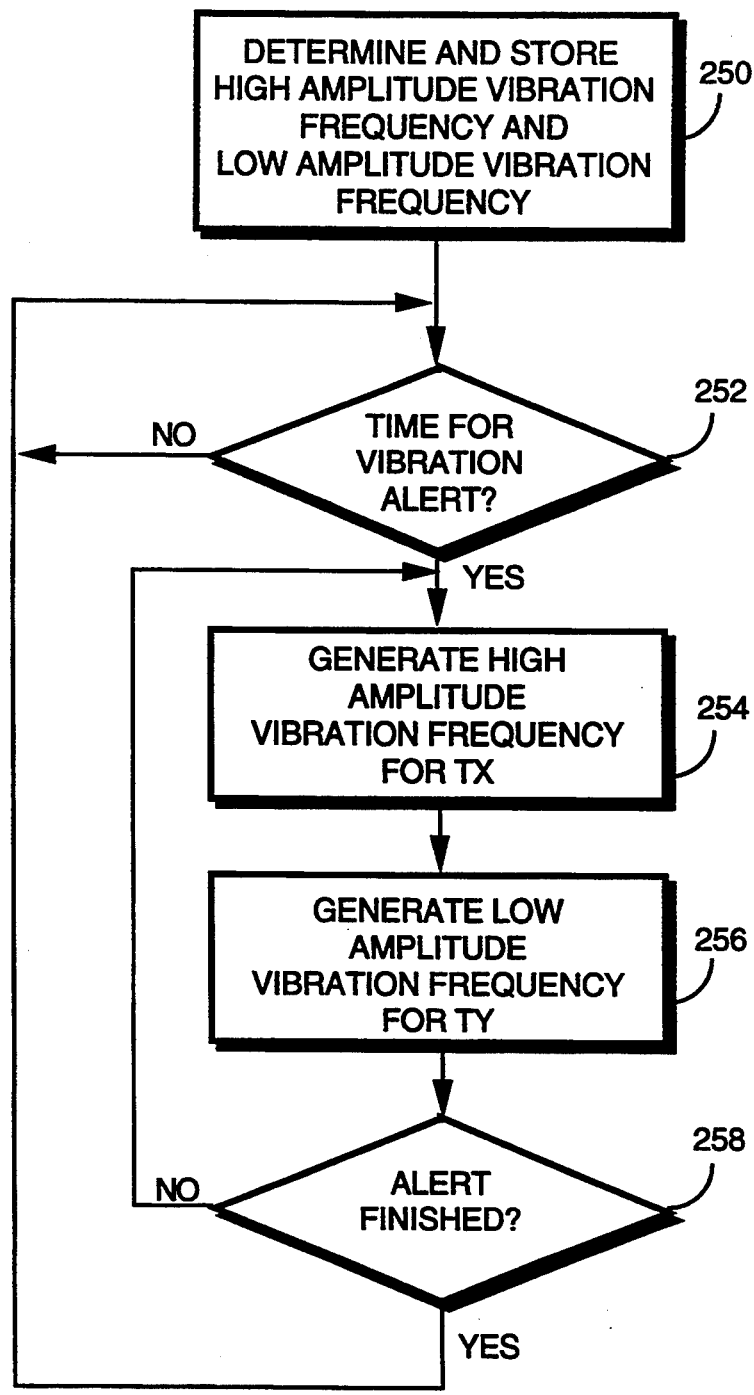
FIG. 10 shows a flowchart for generating a variable frequency and variable amplitude vibratory alert in accordance with a second alternative embodiment of the present invention.

In another alternative embodiment of the present invention the frequency of the vibration is varied during the vibratory alert resulting in both a reduction in the surge current experienced by the battery and other circuits within the pager, as well as providing the user with a variable tactile sensation. FIG. 10 shows a flowchart for generating a variable frequency and variable amplitude vibratory alert in accordance with the present invention. In step 250, a high amplitude vibration frequency and a low amplitude vibration frequency are determined and stored. Such a determination may be made by generation of the table 94 of FIG. 9, as previously described. Alternatively, the table 94 may be predetermined at the time of manufacture of the pager and stored in non-volatile memory 74, thereby eliminating the necessity for sensor 166 and sensor circuit 82 of the pager of FIG. 5. Thus, predetermined typically high and low amplitude vibration frequencies for most expected resonant systems may be stored in memory 74.

Then, step 252 waits for the time when a vibratory alert is to be generated. Step 254 first generates a high amplitude vibration for a first time TX, which is preferably one half second. Then step 256 generates a low amplitude vibration for a second time TY, which also preferably corresponds to one half second. Step 258 causes the repeated execution of steps 254 and 256 for the duration of the alert which is preferably the shorter of either eight seconds or a manual alert reset by the user.

Numerous variations of the above procedure are possible, all of which can provide a distinctive variable tactile sensation in a vibratory alert. Such variations include, beginning with a low amplitude vibration and building to a high amplitude vibration, thereby generating a vibratory alert having an escalating tactile sensation. Alternatively the duration of the intervals of each amplitude may be varied in response to the reason for generating the vibratory alert. This gives the user the advantage of knowing the distinct reason for the alert before the pager is interrogated by the user. For example, a distinctively short TX and long TY may indicate reception of a message, while a distinctively long TX and short TY may indicate a time of day alarm. Furthermore, more than two amplitudes may be used for generating the alert. Finally, the user may be able to ascertain differences in the frequency of the tactile sensations generated by the vibratory alert independent of its amplitude. Thus, the presentation of variable vibration frequencies may be used to distinguish the reason for generation of the alert.

Figure 11:
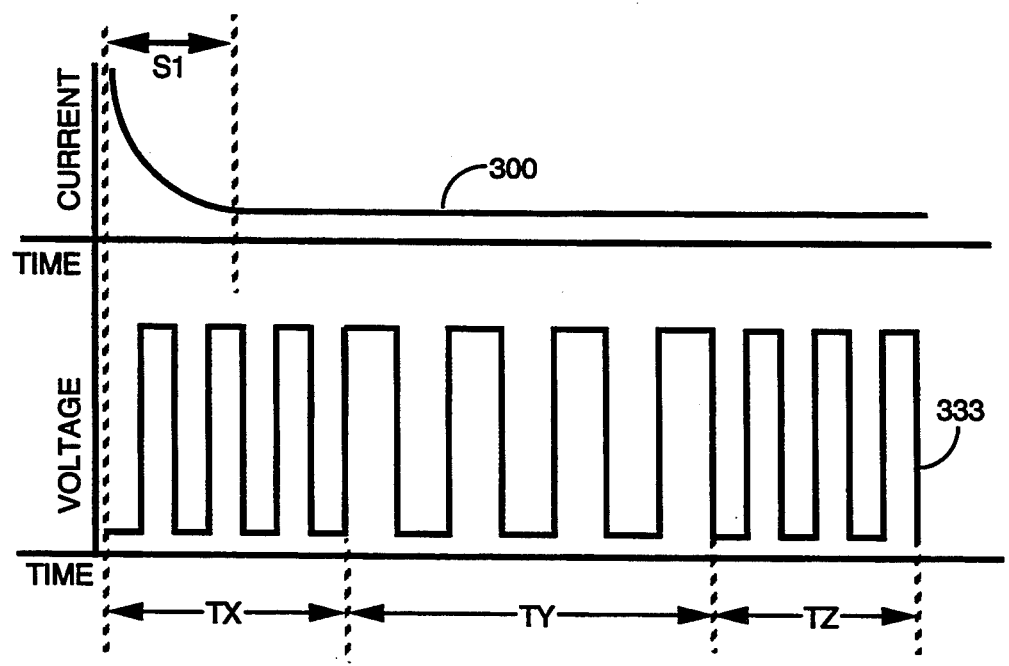
FIG. 11 shows the average current drawn by a vibrator during a two frequency vibratory alert generated in accordance with the second alternative embodiment of the present invention.

FIG. 11 shows the idealized average current drawn by a vibrator during a two frequency vibratory alert generated in accordance with the present invention. Line 300 represents the average current drawn by vibrator 160, and pulsating signal 333 represents the drive signal of vibrator 160 if it were a resonant vibrator such as vibrator 60. During TX, the pulsating signal may drive the vibrator at a frequency corresponding to F3 (FIG. 2) for a duration of one half of a second. As the vibrator starts from a rest state and builds up to a vibrational state having stored energy, the average current surges, as shown by interval S1. The peak current during interval S1 may be greater than one and one half times the average current during the interval after S1, and the duration of interval S1 may range more or less from 10 to 250 mS. Intervals TX and TZ correspond to a high amplitude vibration of step 254. If the vibrator were switched off during interval TY, the current surge S1 would occur again at the beginning of interval TZ, because the vibrator would have returned to a rest state. The invention has the advantage of substantially eliminating the surge current at the beginning of interval TZ, because the vibrator was not returned to a rest state during interval TY. Instead, the vibration frequency is changed to produce a low amplitude vibrational alert with a pulsating signal at a frequency which may correspond to F1 of FIG. 2. The low amplitude vibratory alert gives the user substantially the same overall tactile sensation of a switched vibratory alert which is vibrating during intervals TX and TZ, and not vibrating in interval TY. The elimination of the current surge during interval TZ, and subsequent repetitions of intervals TY and TZ, improves the robust operation of circuitry within the pager 520 when the battery powering the pager approaches the end of its life.

Thus, the invention provides: a method for maximizing the tactile sensation due to the vibratory alert responsive to changes in the resonant frequency of the resonant system; a vibratory alert having improved tactile sensation without increasing the power drawn to provide the vibratory alert; and a method of reducing the current surges while providing the pleasing and distinctive switching of the tactile sensation.

We claim:

1. A method of generating a vibratory alert for vibrating a portable alerting device, said method of generating the vibratory alert, comprising the steps of:
    a first step of driving the vibration frequency of the vibratory alert at a first frequency for vibrating the portable device at a resonant vibrating frequency dependent on a position of the portable device;
    determining the resonant vibrating frequency of the portable device dependent on the position of the portable device in response to and after said first step of driving; and
    a second step of driving the vibratory alert at the resonant vibrating frequency determined in said step of determining the resonant vibrating frequency of the portable device.

2. The method according to claim 1 wherein the portable alerting device includes a resonant vibrator, and wherein
    said first step of driving comprises the step of supplying the resonant vibrator with a pulsating signal having a frequency corresponding to the first frequency, and wherein
    said step of determining determines the resonant frequency of the portable device in response to a back voltage resonant signal generated by the resonant vibrator, the back voltage resonant signal having a frequency component corresponding to the resonant vibration frequency of the resonant system.

3. The method according to claim 2 wherein the first frequency results from a prior execution of said step of determining.

4. A portable alerting device comprising:
    a vibrator for generating a vibratory alert having both a vibration frequency and a vibration amplitude;
    a sensor for sensing a vibration amplitude of the vibratory alert signal and generating the vibratory alert when driven by a pulsating signal wherein the vibration frequency corresponds to a frequency of the pulsating signal; and
    a vibrate controller for adjusting the vibration frequency in response to the vibration amplitude and generating the pulsating signal, 5. The device according to claim 4 wherein the vibrator comprises a resonant vibrator which includes an electromagnetic coil and a moving mass for converting a variable frequency pulsating signal generated by the vibrate controller into a vibratory alert.

6. The device according to claim 4 further wherein
    said vibrator generates the vibrational alert at a variable frequency in response to a vibration frequency signal generated by said vibrate controller; and the device further comprises:
        a memory for storing a plurality of representations of sensed vibration amplitudes in response to generation of the vibratory alert at a corresponding plurality of vibration frequencies, wherein
        said vibrate controller generates a plurality of vibration frequency signals causing said vibrator to vibrate at the plurality of vibration frequencies, said vibrate controller reading the vibration amplitude from said sensor for each of the plurality of vibration frequencies and storing the vibration amplitude in said memory, the vibrate controller selecting a vibration signal corresponding to a maximum amplitude stored in said memory means and generating a vibration frequency signal corresponding to the maximum amplitude.

7. In a portable alerting device, a method of generating a vibratory alert having both a vibration frequency and a vibration amplitude, wherein the vibratory alert is generated with a resonant vibrator driven by a pulsating signal, said method comprising the steps of:
    applying the pulsating signal to the resonant vibrator for a first period;
    the resonant vibrator generates a back voltage signal in response to the vibration amplitude:
        sensing the back voltage signal within the second period; and
        automatically adjusting the vibration frequency in response to said step of sensing, by automatically adjusting a frequency of the pulsating signal.

8. A method of generating a vibratory alert in a portable alerting device, the method comprising the steps of:
    adjusting to a first vibration frequency having a first vibration amplitude during a first portion of the vibratory alert;
    adjusting to a second vibration frequency having a second vibration amplitude substantially different from the first vibration amplitude during a second portion of the vibratory alert; and
    adjusting back to the first vibration frequency during a third portion of the vibratory alert,
    wherein the portable electronic device includes a battery, and
    wherein said step of adjusting to the first vibration frequency during a first portion of the vibratory alert causes a substantial current surge upon the battery, and
    wherein said step of adjusting back to the first vibration frequency during the third portion of the vibratory alert results in a substantial reduction of the substantial current surge upon the battery.

9. A selective call receiver comprising:
    a receiver for receiving a message;
    a housing physically coupled to a user;
    a vibrate controller electrically coupled to the receiver, said vibrate controller for generating a vibrate control signal in response to receiving the message;
    a variable frequency generator electrically coupled to said vibrate controller for generating a variable frequency signal in response to the vibrate control signal;
    a vibrate signal driver electrically coupled to said variable frequency generator for generating a pulsating signal in response to the variable frequency signal, the pulsating signal having a pulsating signal frequency and a pulsating signal amplitude;
    a vibrator transducer electrically coupled to said vibrate signal driver for generating a vibratory alert signal, and said vibrator transducer mechanically coupled to said housing for mechanically coupling the vibratory alert signal to said housing and to the user in response to receiving the message; and
    a sensor electrically coupled to said vibrator transducer for sensing a back voltage signal generated by said vibrator transducer after termination of the pulsating signal, said sensor electrically coupled to said vibrate controller for providing a vibration representative signal corresponding to the sensed back voltage signal, the sensed back voltage signal representative of an amplitude of a vibratory alert signal, wherein said housing contains said receiver, said vibrate controller, said variable frequency generator, said vibrate signal driver, vibrator transducer and said sensor, and wherein said vibrate controller comprises an adjuster for adjusting the vibrate control signal in response to a sensed back voltage signal to increase an amplitude of a vibratory alert signal as represented by a sensed back voltage signal.

10. The selective call receiver of claim 9 wherein a frequency of the sensed back voltage signal is representative of a resonant frequency of a resonant system.

11. The selective call receiver of claim 9 wherein an amplitude of the sensed back voltage signal is representative of an amplitude of a vibratory alert signal.

* * * * *